US010237060B2

(12) United States Patent
Kouladjie et al.

(10) Patent No.: US 10,237,060 B2
(45) Date of Patent: Mar. 19, 2019

(54) MEDIA AGNOSTIC, DISTRIBUTED, AND DEFENDABLE DATA RETENTION

(75) Inventors: Kambiz Kouladjie, Seattle, WA (US); Robert Blanch, Bellevue, WA (US); Robert Devine, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1205 days.

(21) Appl. No.: 13/166,852

(22) Filed: Jun. 23, 2011

(65) Prior Publication Data

US 2012/0331284 A1    Dec. 27, 2012

(51) Int. Cl.
H04L 9/08    (2006.01)
(52) U.S. Cl.
CPC ............. *H04L 9/083* (2013.01); *H04L 9/088* (2013.01)
(58) Field of Classification Search
CPC . H04L 69/329; H04L 2209/56; H04L 12/281; H04L 9/083; G06F 19/00; G06F 21/128
USPC ............................. 705/71; 726/28; 713/158
See application file for complete search history.

(56) References Cited

U.S. PATENT DOCUMENTS

| | | | | |
|---|---|---|---|---|
| 4,578,530 | A * | 3/1986 | Zeidler | 705/71 |
| 5,771,291 | A * | 6/1998 | Newton et al. | 713/185 |
| 6,652,380 | B1 * | 11/2003 | Luciano | G07F 17/32 463/25 |
| 7,702,901 | B2 * | 4/2010 | Ferguson | 713/153 |
| 7,761,704 | B2 * | 7/2010 | Ho et al. | 713/158 |
| 8,707,452 | B1 * | 4/2014 | Block et al. | 726/28 |
| 2002/0042718 | A1 * | 4/2002 | Jett | 705/1 |
| 2002/0199119 | A1 * | 12/2002 | Dunnion et al. | 713/201 |
| 2003/0159044 | A1 * | 8/2003 | Doyle et al. | 713/176 |

(Continued)

FOREIGN PATENT DOCUMENTS

| | | | | |
|---|---|---|---|---|
| EP | 1241643 | A2 * | 9/2002 | G07F 19/00 |
| GB | 2395304 | A * | 5/2004 | G06F 12/14 |

OTHER PUBLICATIONS

Margolus, Norman, The Evolution of a Distributed Storage System, http://citeseerx.ist.psu.edu/viewdoc/download?doi=10.1.1.4.5797 &rep=rep1&type=pdf, published 2004, Cambridge, MA, US.

(Continued)

*Primary Examiner* — William S Powers
(74) *Attorney, Agent, or Firm* — Schwegman Lundberg & Woessner, P.A.

(57) ABSTRACT

A data protector is described. In an implementation, the data protector promotes and enforces a data retention policy of a data consumer. In an implementation, the data protector limits access to sensitive data to the data consumers. A key manager provides a time-limited encryption key to the data protector. Responsive to collection of the time-limited encryption key from the key manager and sensitive data from a data provider, the data protector encrypts the sensitive data with the time-limited encryption key effective to produce encrypted sensitive data. In some embodiments, the data protector provides a data consumer with access to the encrypted sensitive data and the key manager provides the data consumer with access to the time-limited encryption key to decrypt the encrypted sensitive data. The key manager deletes the time-limited encryption key in compliance with the data retention policy of the data consumer.

20 Claims, 6 Drawing Sheets

(56) References Cited

U.S. PATENT DOCUMENTS

| | | | |
|---|---|---|---|
| 2004/0186989 A1* | 9/2004 | Clapper | 713/151 |
| 2004/0243496 A1* | 12/2004 | Kim et al. | 705/35 |
| 2005/0026698 A1 | 2/2005 | Pirich | |
| 2005/0044189 A1* | 2/2005 | Ikezoye et al. | 709/219 |
| 2005/0192830 A1* | 9/2005 | Pugh | G06F 21/6245 705/320 |
| 2006/0072748 A1* | 4/2006 | Buer | G06F 21/72 380/44 |
| 2006/0106724 A1 | 5/2006 | Bar-On | |
| 2006/0156418 A1* | 7/2006 | Polozoff | 726/28 |
| 2006/0174119 A1* | 8/2006 | Xu | H04L 63/08 713/170 |
| 2006/0253584 A1* | 11/2006 | Dixon et al. | 709/225 |
| 2007/0066398 A1* | 3/2007 | Rowan | G07F 17/32 463/42 |
| 2007/0088754 A1 | 4/2007 | Brannon et al. | |
| 2007/0136756 A1* | 6/2007 | Ishida et al. | 725/46 |
| 2007/0162927 A1* | 7/2007 | Ramaswamy et al. | 725/36 |
| 2007/0174302 A1* | 7/2007 | Ishiguro et al. | 707/10 |
| 2007/0185723 A1* | 8/2007 | Shellnutt | 705/1 |
| 2007/0192490 A1* | 8/2007 | Minhas | 709/226 |
| 2007/0208613 A1* | 9/2007 | Backer | 705/10 |
| 2007/0249364 A1* | 10/2007 | Bells et al. | 455/456.1 |
| 2007/0255701 A1* | 11/2007 | Halla et al. | 707/5 |
| 2008/0005204 A1 | 1/2008 | Prus et al. | |
| 2008/0022382 A1* | 1/2008 | Bradbury | 726/10 |
| 2008/0249948 A1* | 10/2008 | Kim et al. | 705/67 |
| 2008/0276098 A1* | 11/2008 | Florencio et al. | 713/183 |
| 2008/0282095 A1* | 11/2008 | Haider et al. | 713/193 |
| 2009/0006569 A1* | 1/2009 | Morss et al. | 709/206 |
| 2009/0111586 A1 | 4/2009 | Clowes | |
| 2009/0220088 A1* | 9/2009 | Lu | G06F 21/554 380/277 |
| 2010/0130169 A1* | 5/2010 | Narayanaswamy et al. | 455/411 |
| 2010/0263009 A1* | 10/2010 | Meuninck et al. | 725/110 |
| 2011/0047081 A1* | 2/2011 | Kelly | G06Q 20/20 705/75 |
| 2011/0055559 A1 | 3/2011 | Li et al. | |
| 2011/0119496 A1* | 5/2011 | Singh | G06F 21/31 713/183 |
| 2011/0126274 A1* | 5/2011 | Sadeckas | 726/7 |
| 2011/0296179 A1* | 12/2011 | Templin | G06F 21/606 713/168 |
| 2011/0302025 A1* | 12/2011 | Hsiao | G06Q 30/02 705/14.42 |
| 2012/0039604 A1* | 2/2012 | Dickens | H04L 47/2441 398/46 |
| 2012/0311034 A1* | 12/2012 | Goldband et al. | 709/204 |
| 2013/0012248 A1* | 1/2013 | Adams et al. | 455/466 |

OTHER PUBLICATIONS

Randal, Burns, et al., Security Constructs for Regulatory-Compliant Storage, http://cacm.acm.org/magazines/2010/1/55770-security-constructs-for-regulatory-compliant-storage/pdf, Communications of the ACM, published Jan. 1, 2010.

Morris, Steven P., et al., Curation and Preservation of Complex Data: The North Carolina Geospatial Data Archiving Project, http://ils.unc.edu/digccurr2007/papers/tuttle_paper_4-3.pdf, accessed on Mar. 28, 2011.

* cited by examiner

DATA CONSUMER A

| Date | Key | Data | Encrypted Data |
|---|---|---|---|
| 1-Mar | 1A | A-IP(1) | A-IP(1) - Key 1A |
| 2-Mar | 2A | A-IP(2) | A-IP(2) - Key 2A |
| 3-Mar | 3A | A-IP(3) | A-IP(3) - Key 3A |
| 4-Mar | 4A | A-IP(4) | A-IP(4) - Key 4A |
| 5-Mar | 5A | A-IP(5) | A-IP(5) - Key 5A |
| 6-Mar | 6A | A-IP(6) | A-IP(6) - Key6A |
| 7-Mar | 7A | A-IP(7) | A-IP(7) - Key 7A |
| 8-Mar | 8A | A-IP(8) | A-IP(8) - Key 8A |

*Fig. 4A*

DATA CONSUMER B

| Date | Key | Data | Encrypted Data |
|---|---|---|---|
| 1-Mar | 1B | B-IP(1) | B-IP(1) - Key 1B |
| 2-Mar | 2B | B-IP(2) | B-IP(2) - Key 2B |
| 3-Mar | 3B | B-IP(3) | B-IP(3) - Key 3B |
| 4-Mar | 4B | B-IP(4) | B-IP(4) - Key 4B |
| 5-Mar | 5B | B-IP(5) | B-IP(5) - Key 5B |
| 6-Mar | 6B | B-IP(6) | B-IP(6) - Key6B |
| 7-Mar | 7B | B-IP(7) | B-IP(7) - Key 7B |
| 8-Mar | 8B | B-IP(8) | B-IP(8) - Key 8B |

*Fig. 4B*

DATA CONSUMER A

| Date | Key | Data | Encrypted Data |
|---|---|---|---|
| 1-Mar |  | A-IP(1) | A-IP(1) - Key 1A |
| 2-Mar | 2A | A-IP(2) | A-IP(2) - Key 2A |
| 3-Mar | 3A | A-IP(3) | A-IP(3) - Key 3A |
| 4-Mar | 4A | A-IP(4) | A-IP(4) - Key 4A |
| 5-Mar | 5A | A-IP(5) | A-IP(5) - Key 5A |
| 6-Mar | 6A | A-IP(6) | A-IP(6) - Key 6A |
| 7-Mar | 7A | A-IP(7) | A-IP(7) - Key 7A |
| 8-Mar | 8A | A-IP(8) | A-IP(8) - Key 8A |

*Fig. 4C*

DATA CONSUMER B

| Date | Key | Data | Encrypted Data |
|---|---|---|---|
| 1-Mar |  | B-IP(1) | B-IP(1) - Key 1B |
| 2-Mar | 2B | B-IP(2) | B-IP(2) - Key 2B |
| 3-Mar | 3B | B-IP(3) | B-IP(3) - Key 3B |
| 4-Mar | 4B | B-IP(4) | B-IP(4) - Key 4B |
| 5-Mar | 5B | B-IP(5) | B-IP(5) - Key 5B |
| 6-Mar | 6B | B-IP(6) | B-IP(6) - Key 6B |
| 7-Mar | 7B | B-IP(7) | B-IP(7) - Key 7B |
| 8-Mar | 8B | B-IP(8) | B-IP(8) - Key 8B |

*Fig. 4D*

MEDIA AGNOSTIC, DISTRIBUTED, AND DEFENDABLE DATA RETENTION

BACKGROUND

Online service providers, such as advertisers, ad networks and publishers can, from time to time, collect user data associated with end users as they navigate the Internet. Such user data can include sensitive data, such as IP addresses, names, location data, financial data and so on. Protecting sensitive data from unintended or unauthorized disclosure continues to be a challenge in the industry. Each jurisdiction regulates the security of sensitive data differently. For example, the European Union has laws that strictly dictate the movement of data and access to databases. Thus, online service providers have to ensure the security and confidentiality of certain sensitive data in compliance with unique regulations in each jurisdiction in which they collect sensitive data. In addition, often two or more business units work together in teams collecting data, including sensitive data, to meet shared business objectives. Typically, sensitive data is transferred to multiple databases. Often, however, these businesses are subject to different online privacy policies, including retention policies, with which each party must separately comply. Ensuring compliance with regulations and retention policies continues to be a challenge for each business unit that handles sensitive data.

SUMMARY

Various embodiments provide a data protector with a data protector computing device, such as a server, for enforcing data retention policies and securing distributed data in and across a variety of media. A data provider such as a Web user provides user data, which can include sensitive data, to the data protector, such as an advertising center. Sensitive data may include, for example, an IP address, a unique identifier, click identifiers, global identifiers, browser type, access times and referring Web site addresses, financial records, social security numbers, birth dates, and certain data that is collected and forwarded by various business entities. Various embodiments enable the data protector to identify and protect sensitive data in compliance with a data protection policy.

In one or more embodiments, a key manager generates a new time-limited encryption key. The key manager provides the data protector, and a data consumer, such as an advertiser, with access to a protected database containing the time-limited encryption key. The data protector encrypts the sensitive data with the time-limited encryption key and in the process generates encrypted sensitive data. The data protector can then share the encrypted sensitive data with the data consumer, which can then use the time-limited encryption key to decrypt the encrypted sensitive data to access the sensitive data. In one or more embodiments, within a definable period of time, such as the end of a retention period defined in the data protection policy, the time-limited encryption key is erased by the key manager. Erasing the time-limited encryption key subsequently makes the sensitive data inaccessible, thus facilitating enforcement of the data retention period in the data protection policy. Various embodiments provide for the data provider, the data protector, data consumer and the key manager to be operated by a single entity, distinct entities or any combination of entities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

FIG. 4A illustrates an example table of dates, encryption keys, Data Consumer A sensitive data and encrypted Data Consumer A sensitive data as an example implementation of a data retention enforcement in accordance with one or more embodiments.

FIG. 4B illustrates an example table of dates, encryption keys, Data Consumer B sensitive data and encrypted Data Consumer B sensitive data as an example implementation of a data retention enforcement in accordance with one or more embodiments.

FIG. 4C illustrates an example table of dates, encryption keys, Data Consumer A sensitive data and encrypted Data Consumer A upon the enforcement of a seven day data retention policy in accordance with one or more embodiments.

FIG. 4D illustrates an example table of dates, encryption keys, Data Consumer B sensitive data and encrypted Data Consumer B upon the enforcement of a seven day data retention policy in accordance with one or more embodiments.

DETAILED DESCRIPTION

Overview

Figure 1:
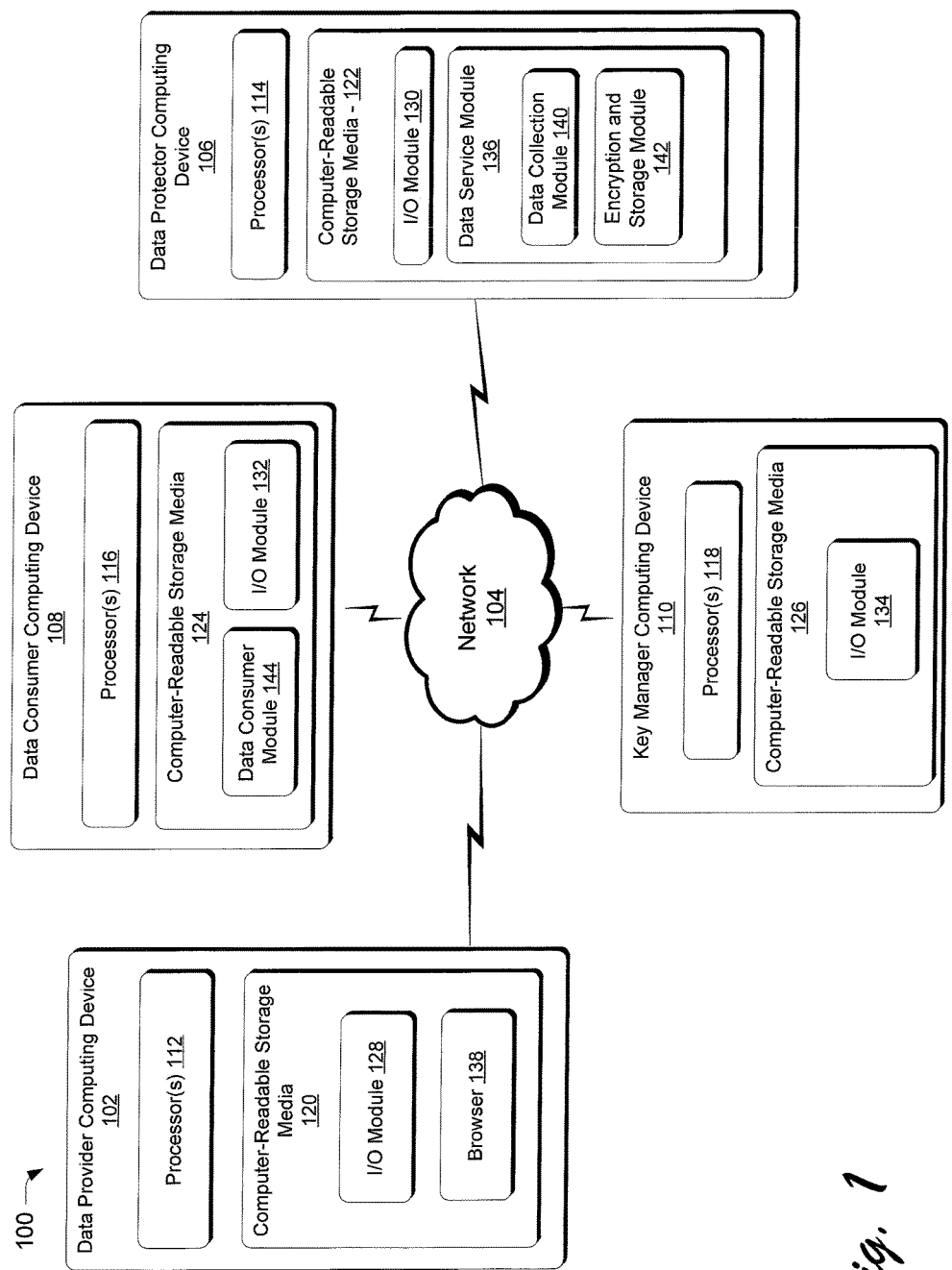
FIG. 1 illustrates an operating environment in which various principles described herein can be employed in accordance with one or more embodiments.

Sensitive data can be generated in connection with a number of different environments, including online commercial environments and offline commercial environments. In online commercial environments, a user operating a data provider computing device can browse content online and, in the course of interacting with the content, sensitive data can be generated and sent to an online service provider using a data protector computing device. Thus, the user is often considered a data provider to advertisers and other online service providers. The data provider can typically receive more relevant and robust services in exchange for his informed consent to the online service providers to use this sensitive user data, which may include sensitive data, which can be collected by the data protector computing device. Sensitive data may include, for example, IP addresses, unique identifiers, click identifiers, global identifiers, browser type, access times and referring Web site addresses, financial records, social security numbers, birth dates, and certain data that is collected and forwarded by various business entities.

For example, an online service provider can be an advertising center, such as adCenter® (adCenter® is a registered trademark of Microsoft Corporation). The advertising center collects user data from users to provide to various data consumers, such as advertisers. The advertising center, acting as a data protector, encrypts the sensitive data with a time-limited encryption key provided by a key manager. In one or more embodiments, the time-limited encryption key resides in the form of a time-stamped encryption key. The advertising center stores the encrypted sensitive data in an access-controlled database. The advertising center protects sensitive data and enforces data retention policy by deleting the time-limited encryption key according to deadlines established by the data retention policy. Without access to the time-limited encryption key, neither the advertising center nor data consumers can decrypt encrypted sensitive data. Consequently, sensitive data is effectively destroyed, thereby enforcing the data retention policy while the sensitive data is protected from being accessed by unauthorized entities.

In the discussion that follows, a section entitled "Operating Environment" is provided and describes one environment in which one or more embodiments can be employed. Following this, a section entitled "Security Example" describes various security operations in accordance with one or more embodiments. Then, a "Limiting Access Example" section describes an access limiting process to limit the access to and protect sensitive data in accordance with one or more embodiments. A "Data Retention Enforcement Example" section illustrates in four tables the process for enforcing data retention policies in accordance with one or more embodiments. Next, a section entitled "Implementation Example of Encryption and Storage Module" describes an example system that can be utilized to implement one or more embodiments. Last, a section entitled "Implementation Example of the Key Manager Computing Device" is used to describe an example key manager that can be used to implement one or more embodiments.

Consider now an example operating environment in which one or more embodiments can be implemented.

Operating Environment

FIG. 1 is an illustration of an example environment 100 in accordance with one or more embodiments. Environment 100 includes a data provider computing device 102, a network 104, a data protector computing device 106, a data consumer computing device 108, and a key manager computing device 110. In one or more embodiments, data provider computing device 102 transmits user data that can include sensitive data, via the network 104, to data protector computing device 106. Sensitive data can be generated in any number of ways such as, by way of example and not limitation, through online commercial transactions. Responsive to receiving the user data, the data protector computing device 106 encrypts sensitive data contained in the user data using a time-limited encryption key received from key manager computing device 110. The data protector computing device 106 stores the encrypted sensitive data. The key manager computing device 110 additionally provides the time-limited encryption key to the data consumer computing device 108 for a limited period of time. Responsive to receiving the time-limited encryption key, the data consumer computing device 108 can access and decrypt the encrypted sensitive data stored on the data protector computing device 106.

The data provider computing device 102, the data protector computing device 106, the data consumer computing device 108 and the key manager computing device 110 can be operated by a single entity or multiple entities and the network 104 can be used to communicate therebetween Network 104 can be any suitable type of network including an Intranet and an Internet. Each computing device (102, 106, 108 and 110) includes a corresponding processor (112, 114, 116, and 118, respectively) and computer-readable storage media (120, 122, 124, and 126, respectively). The computer-readable storage media include various applications and software modules which can include an input/output module (128, 130, 132, and 134, respectively) configured to communicate with the other computing devices via network 104.

The computer-readable storage media can include, by way of example and not limitation, all forms of volatile and non-volatile memory and/or storage media that are typically associated with a computing device. Such media can include ROM, RAM, flash memory, hard disk, removable media and the like Each of the computing devices 102, 106, 108 and 110 can be embodied as any suitable computing device such as, by way of example and not limitation, a server, a desktop computer, a portable computer, a netbook, a handheld computer such as a personal digital assistant (PDA), cell phone, and the like.

Generally, any of the functions described herein can be implemented using software, firmware, hardware (e.g., fixed logic circuitry), or a combination of these implementations. The terms "module," "functionality," and "logic" as used herein, generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the user interface techniques described below are platform-independent, meaning that the techniques may be implemented on a variety of commercial computing platforms having a variety of processors.

On the data protector computing device 106, computer-readable storage media 122 includes a data service module 136, which can be configured to publish Web content or Web sites. The computer-readable storage media 120 on the data provider computing device 102 includes a browser 138 that is configured to access Web sites publishing Web content. Any suitable Web browser can be used examples of which are available from the assignee of this document and others.

In one or more embodiments, data provider computing device 102 can deliver user data, such as an IP address and an entity identifier (e.g., Hotmail® ID (Hotmail® is a registered trademark of Microsoft Corporation)) to the data protector computing device 106 via network 104 along with a request to view Web content. The Web content can be a Web site, an advertisement, or other Web content provided to data protector computing device 106 by data consumer computing device 108. In one or more embodiments, the user data can include sensitive data. In one or more embodiments, user data can become sensitive when aggregated with certain other user data.

Responsive to the request to view Web content from the data provider computing device 102, data protector computing device 106 delivers the Web content to data provider computing device 102 for rendering by browser 138. As the user interacts with the Web content, the data provider computing device 102 generates and delivers additional user data to the data protector computing device 106. For example, as data providers, such as Web users, click on advertisements delivered to their browsers, user data is communicated to the data protector' computing device 106.

The data service module 136 can include a data collection module 140 and an encryption and storage module 142. As user data is received from data provider computing device 102, the user data is collected by the data collection module 140 and sent to the encryption and storage module 142. The data collection module 140 can additionally process the sensitive data to identify sensitive data in the user data. In one or more embodiments, the data protector computing device 106 does not store sensitive data or non-sensitive data until sensitive data has been identified and encrypted.

In one or more embodiments, the encryption and storage module 142 accesses a time-limited encryption key, such as a time-stamped encryption key. The encryption and storage module 142 encrypts sensitive data as it is identified and sorted with the time-limited encryption key, effective to generate encrypted sensitive data. The data protector computing device 106 can then store encrypted sensitive data and user data in a database on the data protector computing device 106. In one or more embodiments, the encryption and storage module 142 is programmed to delete the time-limited encryption key from the data protector computing device 106 within a definable period of time according to an encryption policy.

In one or more embodiments, the encryption and storage module 142 periodically sends a request for a time-limited encryption key through network 104 to the key manager computing device 110. The key manager can then select the appropriate time-limited encryption key and return the time-limited encryption key or otherwise make the time-limited encryption key accessible to the encryption and storage module 142. In one or more embodiments, the key manager computing device 110 deletes the time-limited encryption key from the key manager computing device 110 after a definable period of time has lapsed.

In one or more embodiments, the data consumer computing device 108, specifically a data consumer module 144, sends a request for a time-limited encryption key through network 104 to the key manager computing device 110. Responsive to the request, the key manager can then select the appropriate time-limited encryption key and return the time-limited encryption key or otherwise make the time-limited encryption key accessible to the data consumer module 144. In one or more embodiments, the data consumer computing device 108 is programmed to delete the time-limited encryption key within a definable period of time.

The data protector computing device 106 provides the data consumer computing device 108, specifically the data consumer module 144, with access to the encrypted sensitive data. With access to the time-limited encryption key provided by key manager computing device 110, the data consumer module 144 uses the time-limited encryption key to decrypt the encrypted sensitive data received from the data protector computing device 106. In one or more embodiments, the time-limited encryption key is consumed by the process of decrypting the encrypted sensitive data. In one or more embodiments, responsive to the decryption, data consumer module 144 deletes the time-limited encryption key after use decrypting the sensitive data. After decrypting the sensitive data, the data consumer can use and delete the decrypted sensitive data, or store the decrypted sensitive data for later use.

Having described an example operating environment, consider now a discussion of a security example in which an encryption process is described. The encryption process provides for a key manager to provide time-limited encryption keys to a data protector to encrypt sensitive data received from a data provider. Ultimately, the encrypted sensitive data and the time-limited encryption keys are provided to the data consumer.

Security Example

The following discussion describes an example security process that may be implemented utilizing the previously described systems and devices. Aspects of each of the process steps may be implemented in hardware, firmware, software, or a combination thereof. The process is shown as a set of blocks that specify operations performed by one or more devices and are not necessarily limited to the orders shown for performing the operations by the respective blocks.

Figure 2:
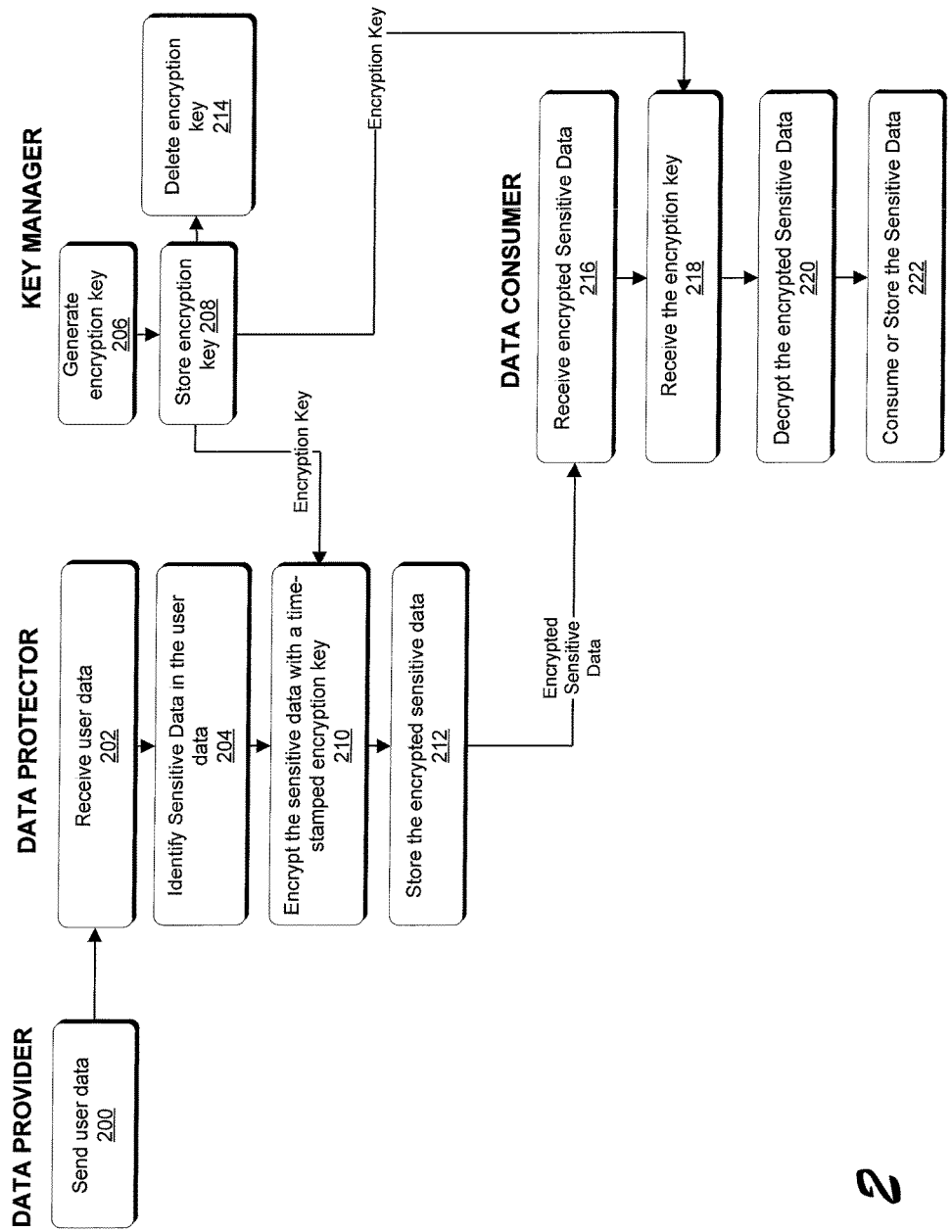
FIG. 2 illustrates an example procedure for securing privacy of sensitive data in accordance with one or more embodiments.

FIG. 2 illustrates an example security process that can be utilized to secure sensitive data that is identified during the course of an online transaction. In this example, four different entities participate in the process and are designated as such, e.g., "Data Provider," "Data Protector," "Data Consumer" and "Key Manager".

As a data provider, such as a user using a data provider computing device, interacts with a particular Web site or Web content, at Block 200 user data, which can include sensitive data, can be generated and sent to a data protector. For example, the user data can be generated when a user clicks on a particular advertisement or interacts with other Web content that the data protector publishes on behalf of a data consumer. Alternately or additionally, user data can be included in a search request on a search engine, such as BING® (BING® is a registered trademark of Microsoft Corporation).

The data protector, such as an advertising center using a data protector computing device, receives user data at Block 202 and processes the user data to identify sensitive data at Block 204. Sensitive data can be identified in any suitable way. For example, sensitive data may fit a particular pattern or have a particular form, such as an IP address. In addition, some user data on its own may not be identified as sensitive until it is combined with other user data. For example, an IP address may not be identified as sensitive until it is combined with a name of a user. Thus, when this pattern is detected, the user data can be tagged or otherwise annotated as sensitive.

The key manager generates time-limited encryption keys, such as time-stamped encryption keys and entity specific time-stamped encryption keys, at Block 206. This can be done in any suitable way. Key generation occurring at Block 206 generates time-stamped encryption keys according to a key generation policy followed by the key manager. In an example implementation, the key generation policy can dictate that key generation occurs at definable intervals of time, such as every thirty minutes, every twelve hours, or every day. Since Block 206 occurs routinely, the key manager can generate time-stamped encryption keys before or after user data is received in Block 202 and provide the key or keys to the data protector. Specifically, in this particular example, the key manager can generate a time-stamped encryption key at Block 206 and store the time-stamped encryption key at Block 208 for subsequent provision to the data protector and the data consumer. In some embodiments, the data consumer generates and delivers a time-stamped encryption key request to the key manager. In these embodiments, responsive to the receipt of the request, the key manager provides the data consumer with access to a protected database storing the time-stamped encryption key.

Once the sensitive data has been identified at Block 204 and the time-stamped encryption key has been provided by the key manager, the data protector can encrypt the sensitive data with a suitably-configured encryption key at Block 210 and store encrypted sensitive data at Block 212. Encryption can be done in any suitable way. For example, suitable encryption methods include public-private encryption keys and AES encryption.

Temporally, the key manager can generate encryption keys at Block 206 and enforce data retention policies by deleting time-stamped encryption keys at Block 214 in any suitable way. For example, the key manager can generate new time-stamped encryption keys at Block 206 while also deleting old time-stamped encryption keys at Block 214.

The data protector, as part of the online transaction, can provide the encrypted sensitive data to the data consumer who receives the encrypted sensitive data at Block 216 In one or more embodiments, the data consumer receives the encryption key from the key management entity at Block 218. Provision of the encryption key to the data consumer can be conducted in a manner which restricts the way in which the data consumer can use the encryption key. For example, restrictions can be placed on, and enforced relative to the ability of the data consumer to permanently store the encryption key. Alternately or additionally, such restrictions can require data consumers and data protectors to eliminate encryption keys after use. Thus, entity based restrictions can ensure that the encryption key is protected and is utilized for authorized operations. The data consumer decrypts the encrypted sensitive data at Block 220 with the time-stamped encryption key and consumes or otherwise stores the sensitive data at Block 222.

When the key manager deletes the old encryption key at Block 214 and other entities delete encryption keys after use, in accordance with data protection policies, sensitive data becomes inaccessible without access to the time-stamped encryption keys. The database storing encrypted sensitive data can be unprotected and the sensitive data is protected after the time-stamped encryption keys are deleted at Block 214. Similarly, encrypted sensitive data can be distributed to a variety of entities and yet the sensitive data remains protected after the time-stamped encryption keys are deleted at Block 214.

By deleting the time-stamped encryption keys after a period of time, the key manager and any other entities ensure that the time-stamped encryption keys are inaccessible. Without access to the time-stamped encryption keys and without copies of the unencrypted sensitive data on the data protector's computing devices, the data protector secures the sensitive data. As the data consumer accesses sensitive data upon decryption, the data consumer can consume the sensitive data by using and destroying the sensitive data to protect the sensitive data from access by unauthorized entities. Alternately or additionally, the data consumer can use a key manager to secure the sensitive data in a process similar to the one described in Blocks 202 through 214 to obtain a new encryption key from its own key manager to encrypt the sensitive data before storing the sensitive data for future use.

Consider now a discussion of an access limiting process in accordance with one or more embodiments.

Limiting Access Example

Figure 3:
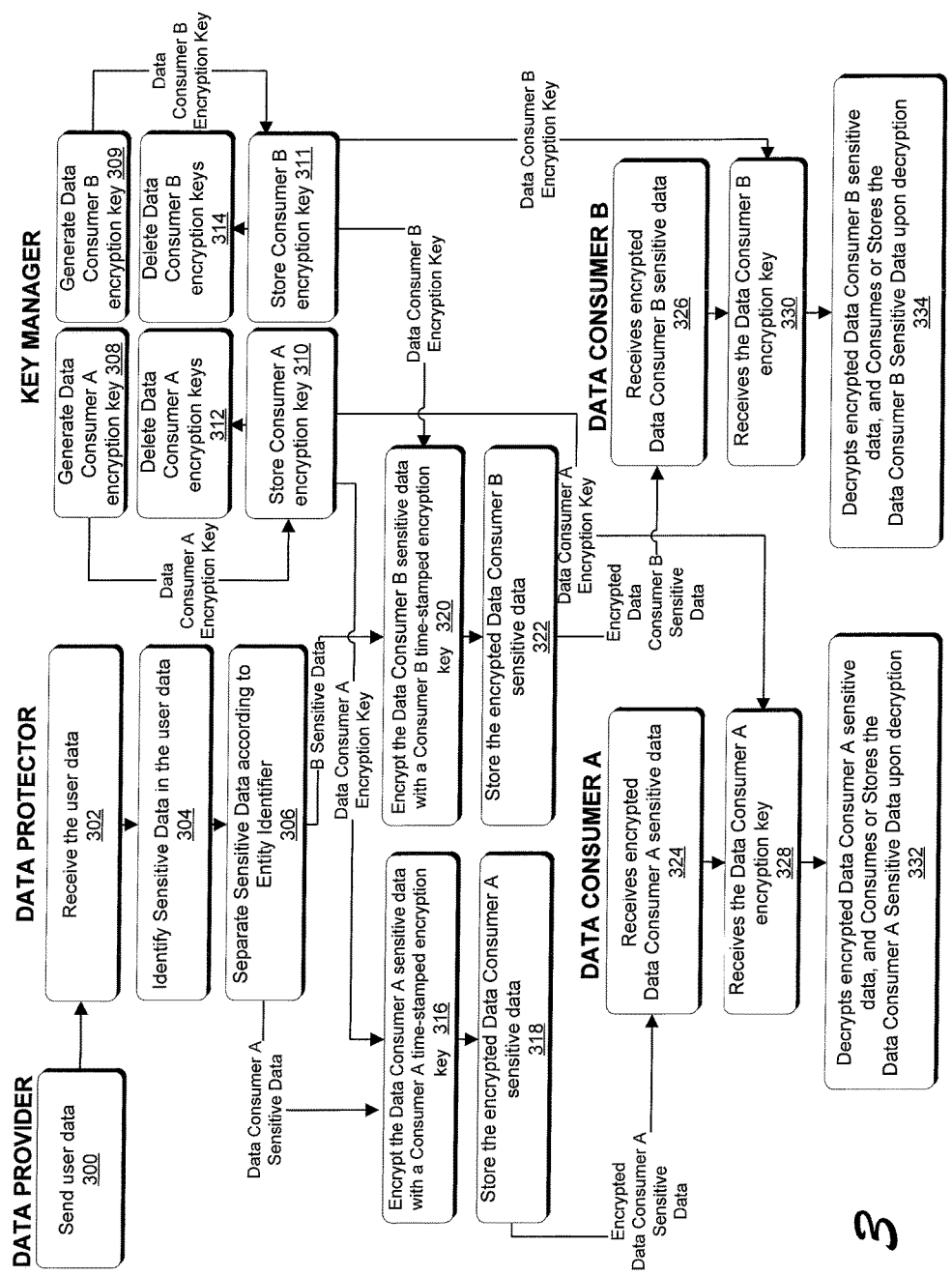
FIG. 3 illustrates an example procedure for regulating access to sensitive data in accordance with one or more embodiments.

FIG. 3 illustrates an example of an access limiting process to limit the access to sensitive data in accordance with one or more embodiments. In portions of the following discussion, references will be made to the environment 100 of FIG. 1. The access limiting process can be operated to protect and secure sensitive data. The access limiting process can also be used to enforce data protection policies. In this example, five entities participate in the process and are designated as such, e.g., "Data Provider," "Data Protector," a first consumer "Data Consumer A," a second consumer "Data Consumer B" and "Key Manager". The access limiting process can operate with any number of data consumers. The data provider can typically receive more relevant and robust services from entities, such as a data protector or a data consumer, in exchange for the data providers' informed consent to the data protector to collect and use user data as described above. For example, a data provider can input search queries into a search engine associated with a data consumer and operated by a data protector. In this example, upon processing user data from the data provider, the data consumer can provide improved search results from the search engine.

At Block 300, the data provider (e.g., an entity using a data provider computing device 102 (FIG. 1)), sends user data associated with an entity identifier, such as a data consumer identifier, through a network, such as network 104, to the data protector. Entity identifiers can include electronic tags in the user data to reflect that the user data is associated with a particular entity, such as a data consumer, and to distinguish the user data from the user data associated with other entities. For example, after a data provider places a search request with a search engine operated by a data consumer, the data protector uses the entity identifier associated with the user data to identify that the user data is linked to the data consumer.

The data protector receives user data at Block 302 and processes the user data to identify sensitive user data at Block 304. At Block 306 the data protector separates sensitive data in the user data according to the entity identifier received with the user data.

Separately, the key manager generates entity specific time-stamped encryption keys at Blocks 308 and 309. In this example, the key manager generates Data Consumer A time-stamped encryption keys at Block 308 and Data Consumer B time-stamped encryption keys at Block 309.

Next, the key manager stores the entity specific time-stamped encryption keys at Blocks 310 and 311. Specifically, at Block 310 the key manager stores the Data Consumer A time-stamped encryption keys. At Block 311 the key manager stores the Data Consumer B time-stamped encryption keys. In some embodiments, the key manager provides the suitable processes or entities within the data protector and the data consumer with access to the protected database of entity specific time-stamped encryption keys. In some embodiments, the data consumers generate and deliver a time-stamped encryption key request, such as an entity specific time-stamped encryption key request, to the key manager. In response to the time-stamped encryption key request, the key manager provides the data consumer with access to a protected database storing the time-stamped encryption key, such as the entity specific time-stamped encryption key. FIG. 3 illustrates the key manager providing access to the entity specific encryption keys through a line connecting Block 310 with Block 316, and through a line connecting Block 311 with Block 320.

The key manager enforces a data retention period in a data retention policy by deleting time-stamped encryption keys at Blocks 312 and 314. In an example implementation, the key manager identifies a date and time on the time-stamp of Data Consumer A time-stamped encryption keys stored at Block 310, compares the date and time with Data Consumer A's data retention policy deadline, and selects the Data Consumer A time-stamped encryption keys at the end of Data Consumer A's data retention period to delete at Block 312. In an example implementation, key manager identifies a date and time on the time-stamp of Data Consumer B time-stamped encryption keys stored at Block 311, compares the date and time with Data Consumer B's data retention policy deadline, and selects the Data Consumer B time-stamped encryption keys at the end of Data Consumer B's retention period to delete at Block 314.

Temporally, key manager may generate entity specific time-stamped encryption keys at Block 308/309 and enforce retention policies by deleting entity specific time-stamped encryption keys at Block 312/314 in any suitable way.

Returning to the data protector, after the entity specific sensitive data has been separated according to entity identifiers at Block 306 and after the data protector has received Data Consumer A time-stamped encryption keys from key manager, the data protector encrypts the entity specific sensitive data, in particular Data Consumer A sensitive data, with a Data Consumer A time-stamped encryption key at Block 316. Data protector stores the encrypted Data Consumer A sensitive data at Block 318.

Similarly, data protector receives and encrypts Data Consumer B sensitive data with a Data Consumer B time-stamped encryption key at Block 320. Data protector stores the encrypted Data Consumer B sensitive data at Block 322.

The data protector can deliver now or provide access to the appropriate encrypted entity specific sensitive data to data consumers matching the entity identifier linked with the entity specific sensitive data at Blocks 324 and 326. In various embodiments, received encrypted data is stored for later decryption by the data consumer, such as Data Consumer A and Data Consumer B, with respective encryption keys that are received at Blocks 328, 330 respectively.

Data consumers can now access the sensitive data by decrypting the encrypted sensitive data with encryption keys. Specifically, Data Consumer A decrypts the encrypted Data Consumer A sensitive data, and consumes or stores the Data Consumer A sensitive data at Block 332. At Block 334, Data Consumer B decrypts the encrypted Data Consumer B sensitive data, and consumes or stores the Data Consumer B sensitive data upon decryption.

By providing each authorized data consumer with the appropriate encrypted entity specific sensitive data associated with the authorized data consumer, and by providing each authorized data consumer with the appropriate entity specific time-stamped encryption key associated with the authorized data consumer, the data protector and the key manager limit the access to the sensitive data to authorized data consumers. By deleting the entity specific time-stamped encryption keys after a period of time, the key manager and other entities ensure that the entity specific time-stamped encryption keys are inaccessible. Without access to the entity specific time-stamped encryption keys and without copies of the unencrypted sensitive data on the data protector's computing devices, the data protector protects the encrypted sensitive data from being decrypted.

Alternatively or additionally, in some embodiments, the entity specific time-stamped encryption keys are provided to the data protector and the time-stamped encryption keys are not shared with the data consumers. In some embodiments, responsive to requests received from the data consumers for the sensitive data, the data protector decrypts the encrypted sensitive data and provides the entity specific sensitive data or a controlled representation of the entity specific sensitive data to the appropriate data consumer. The controlled representation of the entity specific sensitive data prevents the data consumer from making copies of or modifying the entity specific sensitive data. For example, the sensitive data can be saved in a read-only format or in a locked device, so that the sensitive data does not have copy capabilities and is designed to become inaccessible in a tangible format at a data retention deadline. In these embodiments, Data Consumer A consumes or stores Data Consumer A sensitive data or the controlled representation of the Data Consumer A sensitive data. Likewise, in these embodiments, Data Consumer B consumes or stores the controlled representation of the Data Consumer B sensitive data. In such embodiments, the data protector deletes the time-stamped encryption keys upon decrypting the sensitive data or at a data retention deadline. By providing each authorized data consumer with the appropriate controlled representation of entity specific sensitive data, the data protector protects the security of the entity specific sensitive data and limits the access to the entity specific sensitive data to authorized data consumers.

Having described an example implementation of the limiting access process, consider now a discussion of a data retention enforcement example in accordance with one or more embodiments.

Data Retention Enforcement Example

FIGS. 4A-4D illustrate example tables of dates, encryption keys, sensitive data and encrypted sensitive data for example Data Consumers A and B. FIGS. 4A-4D are for illustration purposes and are not meant to represent an aggregation of data utilized by any singular entity without the use of security boundaries between databases of encryption keys and encrypted sensitive data. In particular, FIGS. 4A and 4B illustrate example tables of dates, encryption keys, sensitive data and encrypted sensitive data A and B for example Data Consumers A and B, respectively. In example implementations, key manager stores the encryption keys in a protected database, which may appear as the first two columns of the tables in FIGS. 4A-4D, for use by the appropriate data consumer and data protector. FIGS. 4C and 4D illustrate example tables of dates, encryption keys, sensitive data and encrypted sensitive data A and B for an example Data Consumers A and B, respectively, after a seven day data retention policy has been enforced in accordance with one or more embodiments.

As shown in FIG. 4A, Key 1A is used to encrypt sensitive data, A-IP(1), and to decrypt encrypted sensitive data, A-IP(1)-Key 1A, encrypted on March 1. The encrypted sensitive data is in the form of A-IP(1)-Key 1A, though the encrypted sensitive data can be in other forms depending on the specific encryption method employed. In an example implementation, A-IP(1) represents all of the Data Consumer A IP addresses collected on March 1. The data, A-IP(1), and the encrypted sensitive data, A-IP(1)-Key 1A, depicted in FIG. 4A is specific to Data Consumer A. In this example implementation, a new time-stamped encryption key is created by key manager each day for data protectors to encrypt the sensitive data and for data consumers to decrypt the encrypted sensitive data encrypted on that particular date. For example, on March 2, Key 2A is generated by key manager and used by the data protector for encrypting A-IP(2) data. Key 2A is used by Data Consumer A to decrypt A-IP(2)-Key 2A. Similarly, on March 3, Key 3A is created and later used to encrypt A-IP(3) data and to decrypting A-IP(3)-Key 3A, etc.

Similarly, as shown in FIG. 4B, Key 1B is generated to encrypt sensitive data, B-IP(1), and to decrypt encrypted data, B-IP(1)-Key 1B, encrypted on March 1 for Data Consumer B. The sensitive data and encrypted sensitive data depicted in FIG. 4B is specific to Data Consumer B. Note that in the embodiments shown in FIGS. 4A-4D, consumer-specific keys are used. Thus, Key 1A will not work to decrypt the encrypted sensitive data that was encrypted for Data Consumer B on March 1, and Key 1B will not work to decrypt the encrypted sensitive data that was encrypted for Data Consumer A on March 1, though both Key 1A and Key 1B were created and stored on March 1.

FIG. 4C depicts the date, keys, sensitive data and encrypted sensitive data from FIG. 4A after a seven day data retention policy has been applied or enforced. The enforcement of the policy has resulted in the deletion of Key 1A (depicted in FIG. 4A). Because Key 1A has been deleted, the encrypted data A-IP(1)-Key 1A can no longer be decrypted. As time progresses, the remaining keys will be deleted. For example, Key 2A will be deleted on March 9, Key 3A will be deleted on March 10, etc. FIG. 4D depicts enforcement of a seven-day data retention policy on the sensitive data stored for Data Consumer B. The time period after which the keys will be deleted can vary depending on the specific data retention policy employed. Various embodiments enable data retention policies to be enforced regardless of the ultimate location of the encrypted sensitive data and regardless of the media of the sensitive data.

Consider now a discussion of an example implementation of the encryption module in accordance with one or more embodiments.

Implementation Example of Encryption and Storage Module

Figure 5:
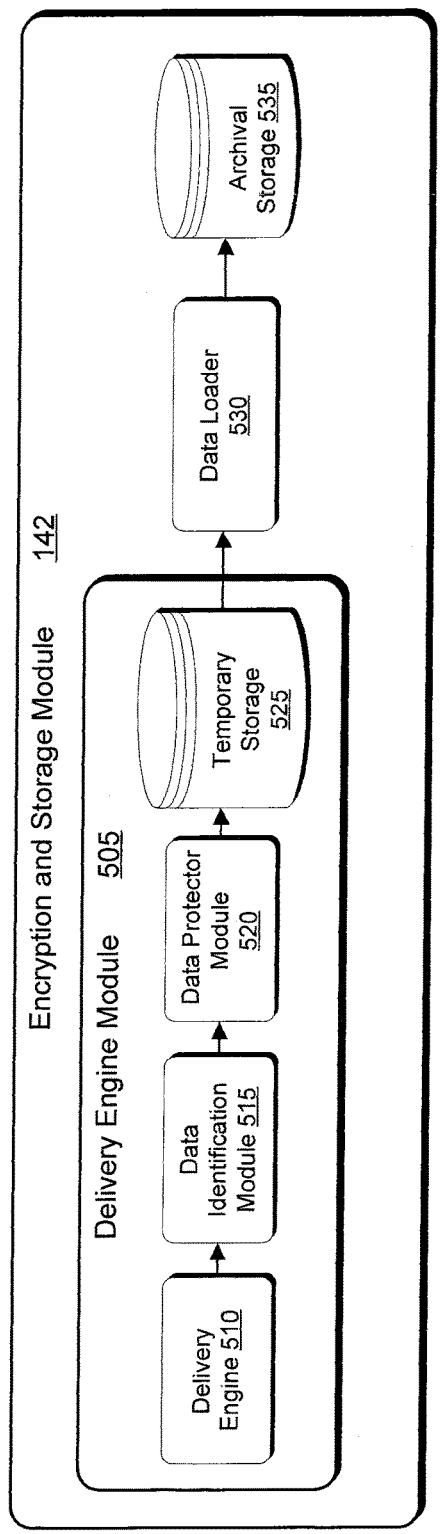
FIG. 5 illustrates an example implementation of the encryption and storage module that can be used to implement one or more embodiments.

Having described a data retention enforcement example, an example implementation of the encryption module in a specific operating environment is described in turn. FIG. 5 illustrates an example encryption and storage module 142, which can be used to implement one or more embodiments. In portions of the following discussion, references will be made to the environment 100 of FIG. 1.

In one or more embodiments, the data protector provides an advertising online service to the data consumer computing device 108. Encryption and storage module 142 includes a delivery engine module 505 having a delivery engine 510 configured to receive a data stream from a data collection module 140 (FIG. 1). The data stream is a stream of user data. In example implementations, the delivery engine module 505 provides click stream analysis and substantially real-time feedback to data consumers, such as advertisers, on the Web content interacted with by data providers. The data consumer computing device 108 is configured to consume the advertising online service provided by the data protector computing device 106. The format of a call that may contain user data varies. For example, the format of a call can be dictated by contract. An example of a call is as follows:

```
ID="11111111111111222" String1="XXXXXX=true"
String2="YYYY.gif, Customer ID=999999,
SE3=where+does+rod+steward+live+in+west+palm+beach+florida&
langim=en&IPAddr=192.168.0.1&pn=0&local=en-
us&form=XXXXXX&P1=XXX&igdv1=XXXXXXXXX&local2=
226.781N,-34440.05W, OptStatus= OPT-IN,
4&bsafe=0&id1=XXXXX&id2=XXXXXXX&id3=XXXXX&id4=
XXXXX&id5=XXXXX &id6=XXXXX, &STPT_IDM=XXXXxxx"
String3="User-Agent: Mozilla/4.0+(compatible)" EncryptedCookie=
"XX&DD=XXXXXXXXXXXXXXXXX&W=1" ........
```

In various embodiments, user data is tagged with an entity identifier, such as a consumer identifier, unique to the user and a data consumer. In the example call illustrated above, the consumer identifier is "999999" designated with the parameter "Customer ID". When the deliver engine 510 receives user data, such as the above illustrated call, the data protector will protect the user data based on the consumer identifier, such as "Customer ID=999999", the encryption policy, and the data retention policy of the data consumer. Delivery engine module 505 can include a data identification module 515, which is configured to identify whether the user data is sensitive or non-sensitive, to separate sensitive data from non-sensitive data, to identify sensitive data by the consumer identifier, and to separate the sensitive data according to the consumer identifier.

In various embodiments, a data protector module 520 uses the consumer identifier identified by the data identification module 515 in an encryption key request sent to the encryption key management module on the key manager computing device. The key management module uses the consumer identifier to select the appropriate encryption policy according to the key encryption instructions received from the policy module. For example, the consumer identifier informs the key management module to provide an entity specific encryption key to the data protector to encrypt the sensitive data tagged with the consumer identifier.

Further, delivery engine module 505 can include the data protector module 520 configured to generate and deliver a request for a time-stamped encryption key to the key manager. In some embodiments, the request for a time-stamped encryption key is a request for an entity specific time-stamped encryption key according to the consumer identifier associated with the sensitive data. The data protector module 520 can receive entity-specific time-stamped encryption keys from the key manager, such as key manager computing device 110 (FIG. 1). Entity specific time-stamped encryption keys are used by the data protector module 520 to encrypt the entity specific sensitive data effective to produce encrypted entity specific sensitive data. The data protector module 520 is configured to upload the encrypted entity specific sensitive data and the non-sensitive data (not encrypted) into a temporary storage 525, which is also included in delivery engine module 505. In example implementations, the temporary storage 525 has a substantially short lifespan, such as one week.

The encryption and storage module 142 includes, in addition to the delivery engine module 505, a data loader 530 and an archival storage 535. The data loader 530 is configured to upload the encrypted sensitive data and the non-sensitive data into the archival storage 535. The archival storage 535 is accessible by selected data consumers. The archival storage 535 is periodically physically purged. The archival storage can be one or more databases, which in some cases are associated with individual data consumers.

Thus, the data protector, specifically the data collection module, receives a stream of user data, which the encryption and storage module 142 protects.

Implementation Example of the Key Manager Computing Device

Figure 6:
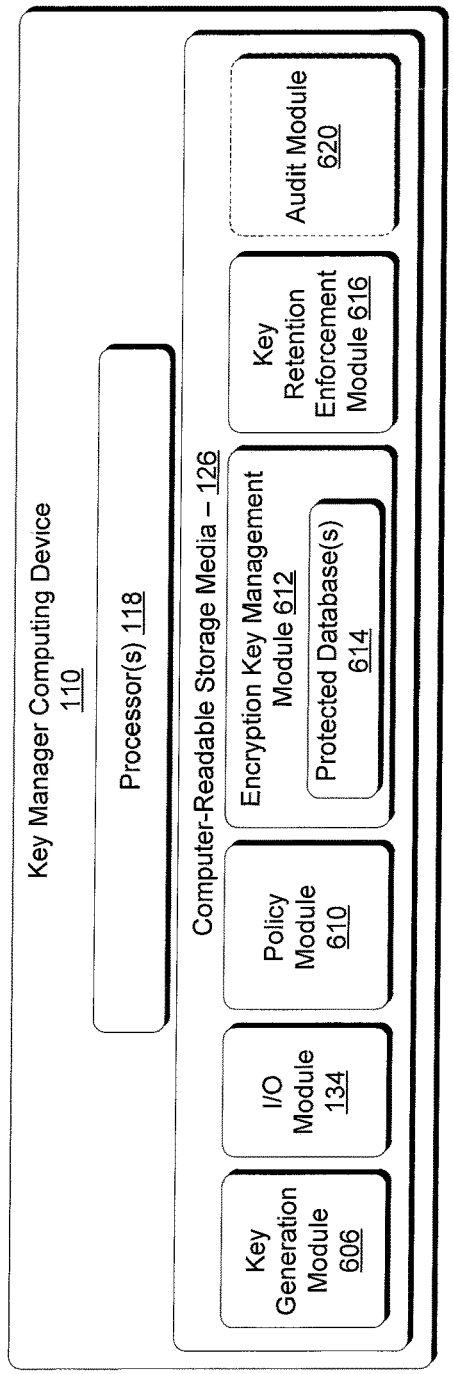
FIG. 6 illustrates an example implementation of the key manager computing device that can be used to implement one or more embodiments.

FIG. 6 is an example of a key manager computing device 110. In portions of the following discussion, references will be made to the environment 100 of FIG. 1. As described in accordance with FIG. 1, the key manager computing device 110 includes a processor 118 and a computer-readable storage media 126. The computer-readable storage media 126 includes a key generation module 606, an input/output module 134, a policy module 610, an encryption key management module 612, and a key retention enforcement module 616, each of which are executable by processor 118.

The policy module 610 is configured to enforce data protection policies, which can include a key generation policy, a data access policy, an encryption policy, a data retention policy and an audit policy. The policy module 610 generates a key generation instruction according to the key generation policy. The policy module 610 delivers the key generation instructions to the key generation module 606. Responsive to key generation instructions, the key generation module 606 generates a time-stamped encryption key. The key generation module 606 delivers the time-stamped encryption key to the encryption key management module 612, which stores the time-stamped encryption key in a protected database 614. For example, the key generation instructions can instruct the key generation module to generate a new time-stamped encryption key on the hour, every hour. Encryption key generation can be done in any suitable way.

In one or more embodiments, the data protector computing device 106 (illustrated in FIG. 1) delivers a request for a time-stamped encryption key, and the request includes an entity identifier, to the key manager computing device 110. Responsive to the request the policy module 610 identifies the entity specific key generation policy to follow based on the entity identifier and generates entity specific key generation instructions. The policy module 610 delivers the entity specific key generation instructions. Responsive to the entity specific key generation instructions, the key generation module 606 generates entity specific time-stamped encryption keys to be stored in the appropriate protected database 614, such as an entity specific protected database.

The policy module generates encryption key access instructions according to the data access policy. The policy module 610 delivers the encryption key access instructions, such as entity specific encryption key access instructions, to the encryption key management module 612. Responsive to the receipt of the encryption key access instructions, the encryption key management module 612 provides the appropriate entities with access to the appropriate protected database storing encryption keys. An example entity specific time-stamped encryption key access instruction can provide selected data consumers (e.g., business units, such as a billing unit) with access to sensitive data, such as IP addresses. In an example implementation, in the event that the user has authorized his location data be used by data consumers for enhanced search results, the data access policy is followed by the key management module governing access to the location data according to encryption key access instructions received from the policy module.

The encryption key management module 612 receives a time-stamped encryption key request with an entity identifier from a data consumer module 144 on the data consumer computing device 108 (FIG. 1) which generated the time-stamped encryption key request. The encryption key management module 612 provides the policy module 610 with at least the entity identifier from the time-stamped encryption key request. Responsive to the entity identifier, the policy module 610 selects an entity specific data access policy to enforce for the data consumer identified in the entity identifier. With the appropriate data access policy selected, the policy module 610 generates and delivers entity specific time-stamped encryption key access instructions to the encryption key management module 612. Responsive to the receipt of the entity specific time-stamped encryption key access instructions, the encryption key management module 612 provides the data consumer computing device with access to the entity specific protected database storing the entity specific time-stamped encryption keys associated with the data consumer. Thus, in one or more embodiments, the key manager computing device 110 enforces the entity specific data access policy with regard to which data consumers receive access to which protected database 614 that stores the entity specific time-stamped encryption keys.

The policy module 610 is also configured to provide key encryption instructions to other devices (e.g., data protector computing device 106 in FIG. 1) according to the encryption policy. Similar to the above, the encryption key management module 612 can receive a request for a time-stamped encryption key from the data protector computing device, and the request can include an entity identifier. In some embodiments, the encryption key management module 612 provides the entity identifier to the policy module 610. In these embodiments, the policy module 610 processes the entity identifier to effect the selection of the appropriate entity specific encryption policy to enforce. With the appropriate entity specific encryption policy identified, the policy module 610 generates and delivers entity specific key encryption instructions to the encryption key management module 612. Responsive to the receipt of the entity specific key encryption instructions, the encryption key management module 612 delivers the appropriate entity specific time-stamped encryption keys to the data protector computing device or provides the data protector computing device with access to the protected database 614. An example of a key encryption instruction is an instruction to send a new entity specific time-stamped encryption key every hour to the data protector computing device. Alternately or additionally, an example key encryption instruction can instruct the data protector computing device to specify an AES encryption with a 192 Bit key with a recommended cipher.

The policy module 610 selects a data retention policy to enforce and generates a key retention enforcement instruction in accordance with the data retention policy. The policy module 610 delivers the key retention enforcement instruction, which includes a data retention policy deadline, to the key retention enforcement module 616. In some cases, the data retention policy is entity specific based on the entity specific time-stamped encryption keys stored in the encryption key management module 612. Responsive to the receipt of the key retention enforcement instruction, the encryption key management module 612 deletes time-stamped encryption keys stored in the protected databases 614 on the computer-readable storage media 126. The key retention enforcement module 616 identifies the date and time on each time-stamped encryption key and compares the date and time on each time-stamped encryption key with the data retention policy deadline provided in the key retention enforcement instruction. Next, the key retention enforcement module 616 selects and deletes the time-stamped encryption key with the date and time at the retention policy deadline from the protected database 614. The policy module 610 governs the deletion of time-stamped encryption keys based on the proximity of the date and time to the various data retention policies For example, the policy module 610 can instruct the key retention enforcement module 616 to delete time-stamped encryption keys twelve hours before the time-stamped encryption keys meet the data retention policy deadline. In an example implementation, the data protection policy is used to enforce data retention governmental regulations, and the data consumers' data retention policies, such as an arbitrary data retention period of ten days for location data.

In one or more embodiments, the key manager computing device 110 includes an audit module 620 that resides on the computer-readable storage media 126 and is executable by the processor 118. The policy module can enforce an audit policy, which can be included in a data protection policy, by generating and delivering audit instructions to the audit module 620. The audit module 620 is configured to audit the key manager computing device processes and generate a compliance report according to the audit instructions. In one or more embodiments, the compliance report is delivered to the data consumer to show the effectiveness of the enforcement of the entity specific data protection policy associated with the data consumer. In one or more embodiments, the compliance report is delivered to the data protector to show the effectiveness of the enforcement of the entity specific data protection policy associated with the data protector. The compliance report can be used to forensically verify enforcement of the data retention policies.

In sum, various modules on the key manager computing device 110 are configured to enforce data protection policies by operating according to policy instructions generated by the policy module 610.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described example implementations, but should be defined only in accordance with the following claims and their equivalent.

What is claimed is:

1. A computer-implemented method implemented by a service provider computing device, the method comprising:
    receiving, from a user computing device at the service provider computing device, user data associated with an end user's interaction with Web content;
    responsive to receiving the user data, processing the user data to identify sensitive data in the user data;
    accessing, from a key manager computing device, a time-limited encryption key, the time-limited encryption key comprising a time-stamped encryption key wherein the time-stamp comprises either a time the encryption key is generated, or a time of encryption of the sensitive data;
    encrypting the sensitive data with the time-limited encryption key effective to provide encrypted sensitive data; and
    providing, by the service provider computing device, the encrypted sensitive data to a data consumer.

2. The method of claim 1, wherein the user data is associated with the user's interaction with an advertisement.

3. The method of claim 1, wherein the user data is associated with the user's interaction with a search engine.

4. The method of claim 1, wherein the sensitive data comprises one or more of an IP address, location data, a name, or financial data.

5. The method of claim 1 wherein the user data is tagged with an identifier of the data consumer, and the time-limited encryption key is specific to the data consumer.

6. The method of claim 1, further comprising causing, by the service provider computing device, the deletion of the time-limited encryption key at a defined time.

7. The method of claim 1, further comprising:
    generating a request for the time-limited encryption key;
    delivering the request for the time-limited encryption key to the key manager computing device; and
    responsive to said delivering, receiving the time-limited encryption key from the key manager computing device.

8. The method of claim 1, further comprising:
    identifying, by the service provider computing device, an entity identifier associated with the sensitive data effective to define entity specific sensitive data;
    generating a request for an entity specific time-limited encryption key according to the entity identifier;
    delivering the request for the entity specific time-limited encryption key to the key manager computing device;
    receiving the entity specific time-limited encryption key from the key manager computing device;
    encrypting the entity specific sensitive data with the entity specific time-limited encryption key effective to produce encrypted entity specific sensitive data; and
    providing the data consumer associated with the encrypted entity specific sensitive data with access to the encrypted entity specific sensitive data.

9. One or more computer-readable storage memories comprising instructions that are executable to cause a service provider computing device to perform a process comprising:
    receiving, by the service provider computing device, user data from a user computing device;
    processing the user data to identify one or more entity identifiers associated with one or more respective entities;
    identifying entity specific sensitive data within the user data, the entity specific sensitive data being associated with at least one of the entities; and
    encrypting the entity specific sensitive data with a time-limited encryption key specifically associated with said at least one of the entities effective to produce encrypted entity specific sensitive data, the time-limited encryption key comprising a time-stamped encryption key wherein the time-stamp corresponds to a time of the generation of the time-limited encryption key, or a time of data encryption with the time-limited encryption key.

10. The one or more computer-readable storage memories of claim 9, wherein the process further comprises providing, by the service provider computing device, the encrypted entity specific sensitive data to a device of the said at least one of the entities.

11. The one or more computer-readable storage memories of claim 10, wherein said receiving the user data comprises receiving the user data in association with a user's online interaction with Web content.

12. The one or more computer-readable storage memories of claim 10, wherein the process further comprises causing, by the service provider computing device, the deletion of the time-limited encryption key.

13. The one or more computer-readable storage memories of claim 10, wherein:
    processing the user data further comprises identifying multiple entity identifiers associated with multiple respective entities;
    identifying entity specific sensitive data further comprises identifying entity specific sensitive data associated with the multiple respective entities;
    encrypting the entity specific sensitive data further comprises encrypting portions of the entity specific data associated with individual entities of the multiple respective entities, the encryption completed with entity specific time-limited encryption keys associated with an individual entity of the multiple respective entities; and
    providing encrypted entity specific sensitive data, further comprising providing the encrypted portions of the entity specific sensitive data to the individual entity of the multiple respective entities associated with the encrypted portion.

14. The one or more computer-readable storage memories of claim 10, wherein the process further comprises:
generating, by the service provider computing device, a request for an entity specific time-limited encryption key according to the entity identifier;
delivering the request for the entity specific time-limited encryption key to a key manager computing device;
receiving the entity specific time-limited encryption key from the key manager computing device;
encrypting the entity specific sensitive data with the entity specific time-limited encryption key effective to produce encrypted entity specific sensitive data; and
providing an entity associated with the encrypted entity specific sensitive data with access to the encrypted entity specific sensitive data.

15. The one or more computer-readable storage memories of claim 9, wherein the process further comprises:
providing a controlled representation of the entity specific sensitive data to a data consumer, wherein the controlled representation of the entity specific sensitive data is in read-only format or in a locked device such that the data consumer is prevented from copying or modifying the entity specific sensitive data and the entity specific sensitive data becomes inaccessible at a data retention deadline; and
deleting the time-limited encryption key.

16. A system comprising:
one or more processors;
one or more computer readable storage media;
one or more modules embodied on the one or more computer readable storage media and executable under the influence of the one or more processors to:
generate a key generation instruction according to a key generation policy;
responsive to the key generation instruction, generate a time-limited encryption key, the time-limited encryption key comprising a time-stamped encryption key;
store the time-limited encryption key in a protected database;
generate an encryption key access instruction according to a data access policy; and
responsive to the encryption key access instruction, provide an online service provider with access to the protected database storing the time-limited encryption key.

17. The system of claim 16, wherein the one or more modules are further executable to:
receive a request for the time-limited encryption key from an advertising center; and
responsive to receiving the request for the time-limited encryption key, identify the key generation policy to follow.

18. The system of claim 16, wherein the one or more modules are further executable to:
select a data retention policy to enforce;
identify a date and time associated with the time-limited encryption key stored in the protected database, the date and time comprising either a time at which the time-limited encryption key was generated or a time at which the time-limited encryption key was used to encrypt data originating on a data provider computing device;
compare the date and time with the data retention policy; and
delete from the protected database the time-limited encryption key in compliance with the data retention policy.

19. The system of claim 18, wherein the one or more modules are further executable to:
audit the processes of the system according to audit instructions; and
generate a compliance report according to the audit instructions.

20. The system of claim 16, wherein:
the generation of the time-limited encryption key is responsive to the key generation instruction and performed upon receipt of a request from the online service provider; and
the time stamp of the time stamped encryption key comprises a time at which the time-limited encryption key was used to encrypt end user data originating on an end user computing device, or a time at which the time-limited encryption key was generated.

* * * * *